(12) United States Patent
Schmidt et al.

(10) Patent No.: US 9,553,819 B2
(45) Date of Patent: Jan. 24, 2017

(54) SYSTEMS AND METHODS FOR TIMING ADJUSTMENT OF METADATA PATHS IN A NETWORK SWITCH UNDER TIMING CONSTRAINTS

(71) Applicant: Cavium, Inc., San Jose, CA (US)

(72) Inventors: Gerald Schmidt, San Jose, CA (US); Guy Hutchison, Santa Clara, CA (US)

(73) Assignee: CAVIUM, INC., San Jose, CA (US)

( * ) Notice: Subject to any disclaimer, the term of this patent is extended or adjusted under 35 U.S.C. 154(b) by 129 days.

(21) Appl. No.: 14/675,246

(22) Filed: Mar. 31, 2015

(65) Prior Publication Data
US 2016/0294719 A1    Oct. 6, 2016

(51) Int. Cl.
*H04W 28/02* (2009.01)
*H04L 12/875* (2013.01)

(52) U.S. Cl.
CPC ................................ *H04L 47/56* (2013.01)

(58) Field of Classification Search
CPC ........... H04L 65/607; H04L 2001/0093; H04L 65/80; H04L 65/4084; H04L 65/602; H04L 1/189; H04L 29/06027
See application file for complete search history.

(56) References Cited

U.S. PATENT DOCUMENTS

| | | | | |
|---|---|---|---|---|
| 2005/0195823 A1* | 9/2005 | Chen | ...................... | H04L 12/185 370/395.1 |
| 2006/0146184 A1* | 7/2006 | Gillard | .................... | H04L 47/10 348/398.1 |
| 2013/0163431 A1* | 6/2013 | Backholm | ......... | H04W 28/0273 370/235 |

\* cited by examiner

*Primary Examiner* — Dang Ton
*Assistant Examiner* — Sai Aung
(74) *Attorney, Agent, or Firm* — Duane Morris LLP; David T. Xue

(57) ABSTRACT

A new approach is proposed that contemplates systems and methods to support automatic timing adjustment of a plurality of paths carrying metadata of incoming data packets in a network switch to meet their respective timing constraints. First, the paths for transmitting different pieces of metadata of incoming packets are identified in the network switch. Once the metadata paths are identified, the proposed approach identifies the timing constraints that the metadata paths need to satisfy in order for the network switch to function properly. The proposed approach then calculates the current delays of the metadata paths and determines optimal timing values of each of the metadata paths in order to meet the timing constraints. The optimal timing values of the metadata paths are then compared to the current delays of the metadata paths to identify the paths which current delay values need to be adjusted. These identified metadata paths are then adjusted accordingly to meet the timing constraints at the minimum cost in terms of additional areas taken by devices and interconnect wires need to be included in the layout of the network switch.

33 Claims, 3 Drawing Sheets

100

300 →

Identify a plurality of metadata paths in the network switch, wherein each of the metadata paths carries a piece of metadata of the incoming packet from one component in the network switch to another component in the network switch
302

Generate a plurality of timing constraints for each of the metadata paths in the network switch, wherein the timing constraints need to be met in order for the network switch to function properly
304

Calculate current path delay of each of the identified paths, wherein the path delay is the time to carry the piece of metadata from one component to another via the path
306

Determine optimal timing values of each of the metadata paths to meet the timing constraints
308

Compare the optimal timing values of the metadata paths to the current timing delays of the paths to identify a set of metadata paths which current delay values do not meet the timing constraints
310

Adjust the delays of the identified set of metadata paths in the network switch to meet the timing constraints at minimum cost
312

FIG. 3

SYSTEMS AND METHODS FOR TIMING ADJUSTMENT OF METADATA PATHS IN A NETWORK SWITCH UNDER TIMING CONSTRAINTS

BACKGROUND

Network switches/switching units are at the core of any communication network. A network switch typically has one or more input ports and one or more output ports, wherein data/communication packets are received at the input ports, processed by the network switch through multiple packet processing components and stages in the network switch, and routed by the network switch to other network devices from the output ports according to control logic of the network switch.

When a data packet is routed through the network switch, a copy of the data encapsulated in the packet (packet data) can be temporarily maintained in a memory/buffer of the network switch. Various components of the network switch can access and process the copy of the packet data in the buffer via a buffer manager without having to maintain multiple identical copies of the data by themselves. During their operations, the various components of the network switch may each perform a plurality of operations on the data of the packet, and may each generate one or more pieces of metadata associated with the packet data. Here, the metadata of the packet is information that is of interest to the network switch and can be utilized by the components of the network switch to process the data of the packet. For non-limiting examples, various pieces of metadata of a packet may include length and/or buffering location(s) of the packet, timing constraints on the packet, destination of the packet, reference count to the copy of the data of the packet in the buffer, number of copies of the packet that need to be created or deleted, etc.

During operation of the network switch, various pieces of metadata of the packet are routed along different (metadata) paths among the various components of the network switch, wherein each path includes one or more cells/components and a plurality of segments of interconnect wires/bus connecting these cells/components. Transmitting the pieces of metadata over the metadata path will encounter timing delay, which includes the internal delay of the cells/components on the metadata path and the interconnect delay over the interconnect wires of the segments of the path. For proper operation of the network switch, the various pieces of metadata may be timing correlated or timing dependent on each other. For a non-limiting example, a first piece of metadata of a packet that includes instructions to increase the reference count to the data of the packet must arrive at a component (e.g., buffer manager) before a second piece of metadata that includes instructions to decrease the reference count to the data of the same packet in order to avoid the so called race condition/problem, where copy of the packet data is deleted from the buffer prematurely because reference count is reduced to zero.

It is thus desirable to be able to automatically determine the timing constraints imposed by the metadata of a packet on the network switch and to adjust the metadata paths of a network switch to meet such timing constraints.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures in which like reference characters refer to the same parts throughout the different views. It is noted that, in accordance with the standard practice in the industry, various features are not drawn to scale and emphasis instead being placed upon illustrating embodiments of the present invention. In fact, the dimensions of the various features may be arbitrarily increased or reduced for clarity of discussion. The scope of the present patent application is not limited to the disclosed embodiments, but also encompasses combinations of the disclosed embodiments, as well as modifications to the disclosed embodiments.

FIG. 3 depicts a flowchart of an example of a process to support automatic timing adjust of metadata paths in a network switch according to an embodiment of the present invention.

DETAILED DESCRIPTION OF EMBODIMENTS

Figure 1:
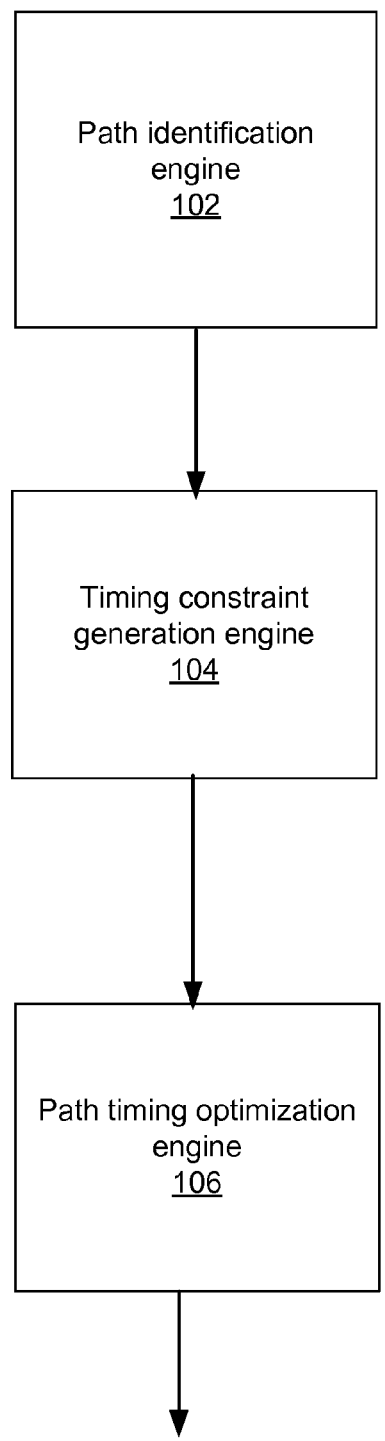
FIG. 1 shows an example of a system diagram to support automatic timing adjust of metadata paths in a network switch according to an embodiment of the present invention.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support timing adjustment of a plurality of paths carrying metadata of incoming data packets in a network switch to meet their respective timing constraints. First, the paths for transmitting different pieces of metadata of incoming packets are identified in the network switch. Once the metadata paths are identified, the proposed approach identifies the timing constraints that the metadata paths need to satisfy in order for the network switch to function properly. The proposed approach then calculates the current delays of the metadata paths and determines optimal timing values of each of the metadata paths in order to meet the timing constraints. The optimal timing values of the metadata paths are then compared to the current delays of the metadata paths to identify the paths which current delay values need to be adjusted. These identified metadata paths are then adjusted accordingly to meet the timing constraints at the minimum cost in terms of additional areas taken by devices and interconnect wires need to be included in the layout of the network switch.

By automatically enforcing the timing constraints on the metadata paths of the network switch, the proposed approach is able to achieve a network switch design that can function properly while avoiding the race conditions/problems. In addition, since the proposed approach adjusts the timing of the metadata paths of the network switch at the minimum cost in terms of number of additional delay cells and/or interconnect wires that need to be included in the layout of the network switch, the proposed approach is able to provide a physical design of the network switch that meets the timing constraints with minimum increase in chip area.

FIG. 1 shows an example of a system diagram to support automatic timing adjustment of a plurality of paths carrying metadata of incoming data packets in a network switch. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a path identification engine 102, a timing constraint generation engine 104, and a path timing optimization engine 106. As used herein, the term engine refers to software, firmware, hardware, or other component that is used to effectuate a purpose. The engine will typically include a computing unit/appliance/host with software instructions that are stored in a storage unit such as a non-volatile memory (also referred to as secondary memory) of the computing unit for practicing one or more processes. When the software instructions are executed, at least a subset of the software instructions is loaded into memory (also referred to as primary memory) by the computing unit, the computing unit becomes a special purpose for practicing the processes. The processes may also be at least partially embodied in the computing unit into which computer program code is loaded and/or executed, such that, the computing unit becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits for performing the processes.

In the example of FIG. 1, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, or a server machine. A storage device can be but is not limited to a hard disk drive, a flash memory drive, or any portable storage device. A communication device can be but is not limited to a mobile phone.

In the example of FIG. 1, the path identification engine 102 is configured to identify a plurality of metadata paths within the network switch, wherein each of the metadata paths carries a piece of metadata/information of the incoming packet from one component in the network switch to another component in the network switch. As discussed above, the metadata includes information that is of interest to the network switch and can be utilized by the components of the network switch to process the data of the packets. Here, each metadata path between two components in the network switch includes one or more devices/components in the network switch and a plurality of path segments each connecting a pair of the one or more devices/components in the network switch. In some embodiments, each of the path segments may comprise one or more interconnect wires laid out in parallel to each other, referred to hereinafter as the width of the path. As such, each metadata path takes a certain amount of area on the chip of the network switch.

In some embodiments, the path identification engine 102 is configured to identify the metadata paths by automatically analyzing design specification of the network switch, wherein such design data can be but is not limited to Verilog hardware description language (HDL). By analyzing the design specification of the network switch at the functional and/or resistor-transistor level (RTL), the path identification engine 102 is configured to identify, for each piece of metadata, where the piece of metadata is generated, where it should be routed to next, and where is its final destination in the network switch. Note that the metadata paths carrying metadata of the packets may not be the same as the routing paths of the data of the packets since the various pieces of metadata are typically generated and exchanged among the components that perform operations on the data of the packets rather than storing the data of the packets.

Figure 2:
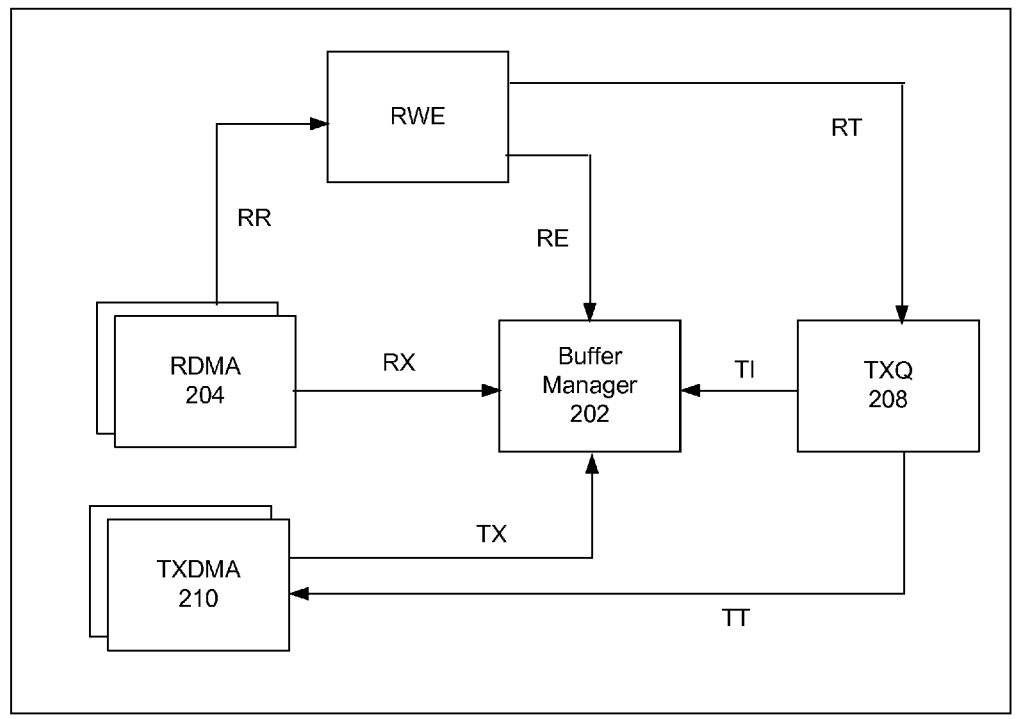
FIG. 2 depicts a non-limiting example of metadata paths identified to carry various pieces of metadata between various components in a network switch according to an embodiment of the present invention.

FIG. 2 depicts a non-limiting example of metadata paths identified by the path identification engine 102 to carry various pieces of metadata between various components in a network switch 200. As shown in the example of FIG. 2, buffer manager 202 manages access to a copy of the packet data stored in a buffer/memory unit (not shown) of the network switch. Any component that needs to perform operation on the packet data has to communicate with the buffer manager 202 in the form of metadata in order to access to the packet data. The buffer manager 202 in turn maintains a reference count to the packet data stored in the buffer, wherein the reference count reflects the number of copies of the packet data requested by the components. For non-limiting examples, a first metadata path P1 carrying a first piece of metadata may include one segment RT between remote direct memory access (RDMA) 204 and buffer manager 202, wherein the first piece of metadata is in the form of (data #, reference count+1), indicating that one additional copies of the packet data is requested by RDMA 204. In additionally, a second metadata path P2 carrying a second piece of metadata may include segment RR from RDMA 204 to Read/Write Unit (RWE) 206 and segment RE from the RWE 206 to buffer manager 202, wherein the second piece of metadata is in the form of (data #, reference count+N), indicating that N additional copies of the packet data is requested by RWE 206. A third metadata path P3 carrying a third piece of metadata may include segment RR from RDMA 204 to RWE 206 and further include segment RT from RWE 206 to Transmit Queue (TXQ) 208 and segment TI from TXQ 208 to buffer manager 202. Here, the third piece of metadata is in the form of (data #, reference count−M), indicating that M copies of the packet data is removed by TXQ 208. In some embodiments, a fourth metadata path P4 carrying a fourth piece of metadata from RDMA 204 may include segments RR and RT, and further include segment TT from TXQ 208 to Transmission remote direct memory access (TXDMA) 210 and segment TX from TXDMA 210 to buffer manager 202. Here, the fourth piece of metadata is in the form of (data #, reference count−1), indicating that one copy of the packet data is removed by TXDMA 210. Note that although a single instance of each of RDMA 204, RWE 206, TXQ 208 and TXDMA 210 is discussed above, the example shown in FIG. 2 includes multiple instances of some of these components, wherein the multiple instances of the components are connected to each other via path segments having multiple interconnect wires running in parallel.

Once the metadata paths are identified, the timing constraint generation engine 104 shown in the example of FIG.

1 is configured to generate a plurality of timing constraints on delays of the metadata paths identified in the network switch, wherein the timing constraints need to be met in order for the network switch to function properly. Here, the delay of each metadata path is the time taken to carry a piece of metadata from one (starting) component to another (end) component via the metadata path, and it includes the cell delays of various devices/cells on the path and interconnect delays of the segments of the metadata path. The timing constraints reflect timing relationships between the various metadata paths which timing delays are correlated with each other, e.g., arriving time of one piece of metadata along one path at certain component in the network switch should be less or greater than another piece of metadata along another path.

In some embodiments, the timing constraint generation engine 104 is configured to generate the timing constraints of the metadata paths by analyzing the design specification of the network switch at the functional and/or RTL level. In some embodiments, the timing constraint generation engine 104 is configured to generate the timing constraints of the metadata paths based on types and characteristics of the various pieces of metadata they carry. In some embodiments, lower and/or bounds may be imposed on the path delays as part of the timing constraints.

In the example of FIG. 2, both the first metadata path P1 carrying the first piece of metadata in the form of (data #, reference count+1) and the second metadata path P2 carrying the second piece of metadata in the form of (data #, reference count+N) should arrive at buffer manager 202 no late than the third metadata path P3 carrying the third piece of metadata in the form of (data #, reference count−M) and the fourth metadata path P4 carrying the fourth piece of metadata in the form of (data #, reference count−1), respectively. Otherwise, if the third and/or fourth pieces of metadata arrive at the buffer manager 202 before the first and/or the second pieces of metadata, the race condition/problem will occur if the reference count to the copy of the packet data may be reduced to below zero, causing the copy of the data packet deleted before it can be accessed by the first and/or the second pieces of metadata originated from RDMA 204. To prevent such race problem in the network switch, the timing constraints among P1, P2, P3, and P4 can be specified as:

$$T_{P1} \leq T_{P3}: T_{RX} \leq T_{RR} + T_{RWE} + T_{RT} + T_{TXQ} + T_{TI}$$

$$T_{P1} \leq T_{P4}: T_{RX} \leq T_{RR} + T_{RWE} + T_{RT} + T_{TXQ} + T_{TT} + T_{TXDMA} + T_{TX}$$

$$T_{P2} \leq T_{P3}: T_{RR} + T_{RWE} + T_{RE} \leq T_{RR} + T_{RWE} + T_{RT} + T_{TXQ} + T_{TI}$$

$$T_{P2} \leq T_{P4}: T_{RR} + T_{RWE} + T_{RE} \leq T_{RR} + T_{RWE} + T_{RT} + T_{TXQ} + T_{TT} + T_{TXDMA} + T_{TX}$$

wherein $T_{P1}$, $T_{P2}$, $T_{P3}$, and $T_{P4}$ represent delays of metadata paths P1, P2, P3, and P4, respectively. $T_{RWE}$, $T_{TXQ}$, and $T_{TXDMA}$ represent internal cell delays of cells/components RWE, TXQ, and TXDMA on the paths, respectively. $T_{RX}$, $T_{RR}$, $T_{RE}$, $T_{RT}$, $T_{TI}$, $T_{TT}$, and $T_{TX}$ represent interconnect delays on segments RX, RR, RE, RT, TI, TT, and TX of the paths, respectively.

In some embodiments, the timing constraints may impose upper bounds on delay of some of the segments, wherein the upper bounds may be buffering delays of a destination components of the segments so that the transmitted piece of metadata may be timely buffered by the components. For a non-limiting example, delay $T_{RR}$ of segment RR can be no larger than buffering delay $B_{RWE}$ of the component RWE, i.e., $T_{RR} \leq B_{RWE}$. In some embodiments, the timing constraints may impose upper bounds on the delay of some of the segments so that the destination components of the segments can be ready to receive the metadata from the paths. For a non-limiting example, delay $T_{RR}$ of segment RR can be lower bounded by $T_{RRmin}$.

In the example of FIG. 1, the path timing optimization engine 106 is configured to calculate current delays of each of the identified metadata paths in the current network switch design. For each device and/or segment on a metadata path, the path timing optimization engine 106 is configured to extract various physical/layout parameters of the device and/or segment from a layout file (e.g., GDS file) of the network switch, wherein the physical parameters of the layout include but are not limited to, internal delay of the cell, actual routing length, layers, and width (number of interconnect wires) as well as resistance (R), capacitance (C), inductance (I) and other parasitic parameters of the interconnect wires of the segment. The path timing optimization engine 106 then calculates delays of the devices and the segments of the metadata paths based on the extracted physical/layout parameters of the devices and/or segments of the metadata path. In some embodiments, the path timing optimization engine 106 is configured to run circuit simulation using the extracted physical parameters of the layout to simulate and calculate the delays of the cells and/or path segments of the metadata.

In the example of FIG. 1, the path timing optimization engine 106 is configured to determine optimal timing values of the metadata paths to meet the timing constraints generated by the timing constraint generation engine 104. In some embodiments, the path timing optimization engine 106 is configured to formulate and solve the problem of determining the optimal timing values of the metadata paths as a linear programming problem, wherein all of the metadata paths are upper-bounded and/or lower bounded as discussed above. Under such formulation, the path timing optimization engine 106 marks that delays of some of the cells and/or segments are fixed, i.e., they are constant, and marks some other cells and/or segments as adjustable, i.e., they are variables in the formulation. In some cases, certain cells and/or segments are identified as fixed because these cells and/or segments are not adjustable due to the limited physical spaces available for placement of the cells and/or routing of the interconnect wires of the segments.

Once the optimal timing values of the metadata paths that meet the timing constraints are calculated, the path timing optimization engine 106 is configured to compare the optimal timing values of the metadata paths to the current timing delays of the paths to identify a set of cells and/or segments of one or more of the metadata paths which current delay values do not meet the timing constraints. Here, the delays of the identified set of cells and/or segments either exceed the upper bounds and/or fall below the lower bounds required by the timing constraints. The path timing optimization engine 106 is then configured to adjust the delays of the identified set of cells and/or segments of one or more of the metadata paths to meet the timing constraints at minimum cost. In some embodiments, the path timing optimization engine 106 is configured to adjust the delays of the identified cells by resizing the cells or replacing the cells with a different cell type in a cell library having a smaller cell delay. In some embodiments, the path timing optimization engine 106 is configured to adjust the delays of the identified path segments by rerouting (to be longer or shorter) and/or resizing (e.g., changing the widths of) interconnect wires of the identified path segments. In some embodiments, the path timing optimization engine 106 is configured to adjust the delays of the identified path segments by inserting and/or removing one or more delay cells (e.g., flip-flops), which are often used to adjust timing delay of a path in a chip, at certain positions on the interconnect wires of the path segments to increase or decrease the timing delay of one or more metadata paths. In some embodiments, the path timing optimization engine 106 is configured to adopt one or more of the approaches described here to adjust the time delay of the one or more metadata paths depending on which of the approaches alone or in combination can meet the timing constraints at the minimum costs in terms of areas occupied by the identified cells on the paths, by the lengths and/or widths of the interconnect wires of the identified path segments, and by the inserted delay cells to the identified path segments.

FIG. 3 depicts a flowchart of an example of a process to support automatic timing adjust of metadata paths in a network switch. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a plurality of metadata paths in the network switch are identified, wherein each of the paths carries a piece of metadata of the incoming packet from one component in the network switch to another component in the network switch. The flowchart 300 continues to block 304, where a plurality of timing constraints are generated for each of the metadata paths in the network switch, wherein the timing constraints need to be met in order for the network switch to function properly. The flowchart 300 continues to block 306, where current path delays of each of the identified metadata paths are calculated, wherein the path delay is the time to carry the piece of metadata from one component to another via the metadata path. The flowchart 300 continues to block 308, where optimal timing values of each of the metadata paths to meet the timing constraints are determined. The flowchart 300 continues to block 310, where the optimal timing values of the metadata paths are compared to the current timing delays of the paths to identify one or more metadata paths which current delay values do not meet the timing constraints. The flowchart 300 ends at block 312 where the delays of the identified one or more metadata paths in the network switch are adjusted to meet the timing constraints at minimum cost.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A computer-implemented system including a processor executing instructions stored in a storage medium to support automatic timing adjustment of metadata paths in a network switch, comprising:
   a path identification engine running on a host and configured to identify a plurality of metadata paths in the network switch, wherein each of the metadata paths carries a piece of metadata of the incoming packet from one component in the network switch to another component in the network switch;
   a constraint generation engine running on a host and configured to generate a plurality of timing constraints for each of the metadata paths in the network switch, wherein the timing constraints need to be met in order for the network switch to function properly;
   a path timing optimization engine running on a host and configured to:
   calculate current path delays of each of the identified metadata paths, wherein the path delay is the time to carry the piece of metadata from one component to another via the metadata path;
   determine optimal timing values of each of the metadata paths to meet the timing constraints;
   compare the optimal timing values of the metadata paths to the current timing delays of the paths to identify one or more metadata paths which current delay values do not meet the timing constraints;
   adjust the delays of the identified one or more metadata paths in the network switch to meet the timing constraints at minimum cost.

2. The system of claim 1, wherein:
   the piece of metadata includes information of the incoming packet that is of interest to the network switch and is utilized by various components of the network switch to process the data of the incoming packet.

3. The system of claim 1, wherein:
each metadata path in the network switch includes one or more devices/components in the network switch and a plurality of path segments each connecting a pair of the one or more devices/components in the network switch.

4. The system of claim 3, wherein:
each of the path segments comprises one or more interconnect wires laid out in parallel to each other.

5. The system of claim 3, wherein:
the delay of the metadata path includes delays of devices/cells on the path and interconnect delays of the segments of the metadata path.

6. The system of claim 1, wherein:
the path identification engine is configured to identify the metadata paths by automatically analyzing design specification of the network switch.

7. The system of claim 1, wherein:
the constraint generation engine is configured to generate the timing constraints of the metadata paths by analyzing design specification of the network switch at functional and/or resistor-transistor level (RTL).

8. The system of claim 1, wherein:
the constraint generation engine is configured to generate the timing constraints of the metadata paths based on types and characteristics of the pieces of metadata they carry.

9. The system of claim 8, wherein:
each piece of the metadata includes reference count to a copy of data of the incoming packet stored in a buffer of the network switch.

10. The system of claim 1, wherein:
the timing constraints of the metadata paths avoid race problems in the network switch.

11. The system of claim 1, wherein:
the timing constraints of the metadata paths are lower-bounded and/or upper bounded.

12. The system of claim 1, wherein:
the path timing optimization engine is configured to extract various physical layout parameters of devices and/or segments of each of the identified metadata paths from a layout file of the network switch.

13. The system of claim 12, wherein:
the path timing optimization engine is configured to calculate delays of the devices and the segments of the metadata paths based on the extracted physical layout parameters of the devices and/or segments of the metadata path.

14. The system of claim 12, wherein:
the path timing optimization engine is configured to run circuit simulation using the extracted physical parameters of the layout to simulate and calculate delays of the cells and/or segments of the metadata.

15. The system of claim 1, wherein:
the path timing optimization engine is configured to determine the optimal timing values of the metadata paths as a linear programming problem, wherein all of the metadata paths are upper-bounded and/or lower bounded.

16. The system of claim 15, wherein:
the path timing optimization engine is configured to mark delays of some of the cells and/or segments as constant and marks other cells and/or segments as variables in the formulation.

17. The system of claim 1, wherein:
the path timing optimization engine is configured to adjust delays of one or more cells on the identified metadata paths by resizing the cells or replacing the cells with a different cell type in a cell library having a smaller cell delay.

18. The system of claim 1, wherein:
the path timing optimization engine is configured to adjust delays of one or more path segments on the identified metadata paths by rerouting and/or resizing interconnect wires of the path segments.

19. The system of claim 1, wherein:
the path timing optimization engine is configured to adjust delays of one or more path segments on the identified metadata paths by inserting and/or removing one or more delay cells used to adjust timing delay of a path, at certain positions on interconnect wires of the one or more path segments to increase or decrease the delay of the identified metadata paths.

20. A computer-implemented method to support automatic timing adjust of metadata paths in a network switch, comprising:
identifying a plurality of metadata paths in the network switch, wherein each of the metadata paths carries a piece of metadata of the incoming packet from one component in the network switch to another component in the network switch;
generating a plurality of timing constraints for each of the metadata paths in the network switch, wherein the timing constraints need to be met in order for the network switch to function properly;
calculating current path delays of each of the identified metadata paths, wherein the path delay is the time to carry the piece of metadata from one component to another via the metadata path;
determining optimal timing values of each of the metadata paths to meet the timing constraints;
comparing the optimal timing values of the metadata paths to the current timing delays of the paths to identify one or more metadata paths which current delay values do not meet the timing constraints;
adjusting the delays of the identified one or more metadata paths in the network switch to meet the timing constraints at minimum cost.

21. The computer-implemented method of claim 20, further comprising:
identifying the metadata paths by automatically analyzing design specification of the network switch.

22. The computer-implemented method of claim 20, further comprising:
generating the timing constraints of the metadata paths by analyzing design specification of the network switch at functional and/or resistor-transistor level (RTL).

23. The computer-implemented method of claim 20, further comprising:
generating the timing constraints of the metadata paths based on types and characteristics of the pieces of metadata they carry.

24. The computer-implemented method of claim 23, wherein:
each piece of the metadata include reference count to a copy of data of the incoming packet stored in a buffer of the network switch.

25. The computer-implemented method of claim 20, wherein:
extracting various physical layout parameters of devices and/or segments of each of the identified metadata paths from a layout file of the network switch.

26. The computer-implemented method of claim 25, wherein:
   calculating delays of the devices and the segments of the metadata paths based on the extracted physical layout parameters of the devices and/or segments of the metadata path.

27. The computer-implemented method of claim 25, wherein:
   running circuit simulation using the extracted physical parameters of the layout to simulate and calculate delays of the cells and/or segments of the metadata.

28. The computer-implemented method of claim 20, wherein:
   determining the optimal timing values of the metadata paths as a linear programming problem, wherein all of the metadata paths are upper-bounded and/or lower bounded.

29. The computer-implemented method of claim 28, wherein:
   marking delays of some of the cells and/or segments as constant and marking other cells and/or segments as variables in the formulation.

30. The computer-implemented method of claim 20, wherein:
   adjusting delays of one or more cells on the identified metadata paths by resizing the cells or replacing the cells with a different cell type in a cell library having a smaller cell delay.

31. The computer-implemented method of claim 20, wherein:
   adjusting delays of one or more path segments on the identified metadata paths by rerouting and/or resizing interconnect wires of the path segments.

32. The computer-implemented method of claim 20, wherein:
   adjusting delays of one or more path segments on the identified metadata paths by inserting and/or removing one or more delay cells used to adjust timing delay of a path, at certain positions on interconnect wires of the one or more path segments to increase or decrease the delay of the identified metadata paths.

33. A non-transitory storage medium having software instructions stored thereon that when executed by a processor cause a system to:
   automatically identify a plurality of metadata paths in the network switch, wherein each of the metadata paths carries a piece of metadata of the incoming packet from one component in the network switch to another component in the network switch;
   generate a plurality of timing constraints for each of the metadata paths in the network switch, wherein the timing constraints need to be met in order for the network switch to function properly;
   calculate current path delays of each of the identified metadata paths, wherein the path delay is the time to carry the piece of metadata from one component to another via the metadata path;
   determine optimal timing values of each of the metadata paths to meet the timing constraints;
   compare the optimal timing values of the metadata paths to the current timing delays of the paths to identify one or more metadata paths which current delay values do not meet the timing constraints;
   adjust the delays of the identified one or more metadata paths in the network switch to meet the timing constraints at minimum cost.

* * * * *